(12) United States Patent
Larsson

(10) Patent No.: US 8,910,894 B2
(45) Date of Patent: Dec. 16, 2014

(54) SEAT-BELT PRETENSIONER

(75) Inventor: Linus Larsson, Barne-Åsaka (SE)

(73) Assignee: Autoliv Development AB, Värgärda (SE)

( * ) Notice: Subject to any disclaimer, the term of this patent is extended or adjusted under 35 U.S.C. 154(b) by 196 days.

(21) Appl. No.: 13/580,998

(22) PCT Filed: Jan. 22, 2011

(86) PCT No.: PCT/EP2011/000260
§ 371 (c)(1),
(2), (4) Date: Nov. 13, 2012

(87) PCT Pub. No.: WO2011/103948
PCT Pub. Date: Sep. 1, 2011

(65) Prior Publication Data
US 2013/0056572 A1 Mar. 7, 2013

(30) Foreign Application Priority Data
Feb. 24, 2010 (DE) .......................... 10 2010 009 155

(51) Int. Cl.
*B60R 22/38* (2006.01)
*B60R 22/46* (2006.01)
(52) U.S. Cl.
CPC ....... B60R 22/4676 (2013.01); *B60R 2022/468* (2013.01)
USPC ...................... 242/374; 242/375.2; 242/379.1
(58) Field of Classification Search
CPC .................. B60R 22/4676; B60R 2022/468
USPC ............................. 242/374, 375, 375.2, 379.1
See application file for complete search history.

(56) References Cited

U.S. PATENT DOCUMENTS

| | | | | |
|---|---|---|---|---|
| 5,687,925 A | * | 11/1997 | Sayles | ............. 242/379.1 |
| 5,938,135 A | | 8/1999 | Sasaki et al. | |
| 6,926,221 B2 | * | 8/2005 | Rohrle et al. | ............. 242/379.1 |
| 7,458,535 B2 | * | 12/2008 | Holbein et al. | ............. 242/375.2 |

FOREIGN PATENT DOCUMENTS

| | | |
|---|---|---|
| DE | 10 2008 003 365 A1 | 8/2009 |
| EP | 0 737 606 A1 | 10/1996 |
| EP | WO 2009/118088 A1 | 10/2009 |

OTHER PUBLICATIONS

PCT International Search Report—Apr. 21, 2011.
Examination Report—Oct. 21, 2010.

* cited by examiner

*Primary Examiner* — Sang Kim
(74) *Attorney, Agent, or Firm* — Brinks Gilson & Lione

(57) ABSTRACT

A seat belt pretensioner having a housing, a belt shaft (10), a load limiting device (70) and a pretensioner drive wheel (20) coupled to the belt shaft (10). A coupling element (60) is fixed to the drive wheel (20) via a detachable connection, and can be locked by a blocking device (90). An engagement wheel (50) is provided for connecting the belt shaft (10) with the pretensioner drive wheel (20) having engagement portions (51) engaging into corresponding recesses (12) on the belt shaft (10) or on the pretensioner drive wheel (20) and is fixed by the coupling element (60). The detachable connection can be disconnected by locking of the coupling element (60) and rotation of the belt shaft (10) in the belt webbing extraction direction, thereby the engagement wheel (50) undergoes relative rotation in relation to the pretensioner drive wheel (20) or to the belt shaft (10).

6 Claims, 4 Drawing Sheets

SEAT-BELT PRETENSIONER

CROSS-REFERENCE TO RELATED APPLICATIONS

This application claims priority to German patent application number 10 2010 009 155.3, filed Feb. 24, 2010 and PCT/EP2011/000260, filed Jan. 22, 2011.

FIELD OF THE INVENTION

The invention relates to a seat-belt pretensioner for a motor vehicle belt restraint system.

BACKGROUND OF THE INVENTION

Seat-belt pretensioners are used in motor vehicles to enhance occupant protection of a belted occupant at the start of an accident by retracting the seat-belt to couple the passenger to the vehicle deceleration as soon as possible, Because of the early coupling of the passenger, the restraint force acting on him or her is reduced, in that it is distributed on the longest possible path of forward displacement. In order that the longest possible path of forward displacement is also utilized in full, the seal-belt retractor with a pretensioner function is furthermore provided with a force limiting device by means of which a force-limited, seat-belt strap extraction is facilitated. The force on the passenger during the force-limited forward displacement is determined by the design of the force limiting device, whereby various force limiting sequences can be adjusted by combining several force limiting elements.

The disadvantage with systems mentioned above, however, is that because of the successive opposite rotating movements of the belt shaft during the belt tightening process which produces belt retraction, and the force limitation which occurs during belt extension, the seat-belt strap force limitation can be obstructed by the still applied tensioning force exerted by the seat-belt pretensioner. This disadvantageous force limitation impediment can thereby result in a short-term peak at the start of the force limiting process.

A seat-belt pretensioner of the above-referenced type is known from WO 2009/118088 in which a locking element is provided to couple the pretensioner drive wheel to the belt shaft and in which the locking element can be detached by turning of the belt shaft in the direction of the seat-belt strap extraction after the tensioning movement has been completed. The pretensioner drive wheel and the belt shaft are coupled with each other by means of a ramp contour which forces an axial movement of the tension drive wheel with respect to the belt shaft. The locking element is formed, for example, by a spring disk which is moved into a ready position by the activation of the tensioning movement in that it engages with spring arms in a fixed-housing gear. By means of the developing force-limited seat-belt strap extraction movement, the locking element fixed in the fixed-housing gear in the direction of the belt extraction executes a release movement and thereby enables the axial movement of the pretensioner drive wheel with respect to the belt shaft, whereupon the pretensioner drive wheel and the belt shaft disengage.

A disadvantage of the solution described above is that the locking element must first be brought to a ready position by the tensioning movement in which it is fixed in the seat-belt strap extraction direction with respect to the housing. Furthermore, the locking element couples the pretensioner drive wheel to the belt shaft by exerting an axial force and must therefore have a certain form stability in order to absorb the impacting forces.

The object of the invention is to create a seat-belt pretensioner in which the disadvantages mentioned above are avoided.

BRIEF SUMMARY OF THE INVENTION

The object of the invention is achieved by the seat-belt pretensioner with the characteristics described and claimed herein. The basic idea of the invention is that a coupling element fixed in the circumferential direction via a detachable connection is provided which is blocked in the seat-belt strap extraction direction by a blocking device in a fixed housing, and a engagement wheel is provided to connect the seat-belt shaft with the pretensioner drive wheel which body engages with axially aligned, conical engagement sections into corresponding recesses on the seat-belt shaft or the pretensioner drive wheel and is secured on the pretensioner drive wheel in the circumferential direction by the coupling element. The retractor provides a detachable connection between the coupling element and the pretensioner drive wheel detached in the seat-belt strap extraction direction by the fixed-housing blockage of the coupling element and a rotation of the seat-belt shaft, and thereby enables a rotation movement of the engagement wheel relative to the tension drive wheel and/or to the seat-belt shaft which is superimposed by means of the conical engagement sections with an axial movement. The engagement sections disengage from the recesses and the positive connection between the pretensioner drive wheel and the seat-belt shaft can be terminated.

The advantage of the inventive solution can be seen in the fact that the coupling element, which is fixed to the pretensioner drive wheel and prevents the engagement wheel from undergoing relative rotation movement during the tensioning movement, releases independently from the pretensioner drive wheel solely by a fixed-housing blockage and a rotation of the seat-belt shaft in the direction of seat-belt extraction. It is thereby not required to bring the coupling element to a ready position before the release of the connection to the pretensioner drive wheel, as is necessary in the known prior art solution. Furthermore, the coupling element itself is basically less stressed in an axial direction so that the requirements of the strength of the coupling element are lower, and the release movement can be carried out under the influence of smaller external forces.

BRIEF DESCRIPTION OF THE DRAWINGS

The invention will be explained in more detail below with reference to a preferred exemplary embodiment. The figures specifically show.

DETAILED DESCRIPTION OF THE INVENTION

Figure 1A:
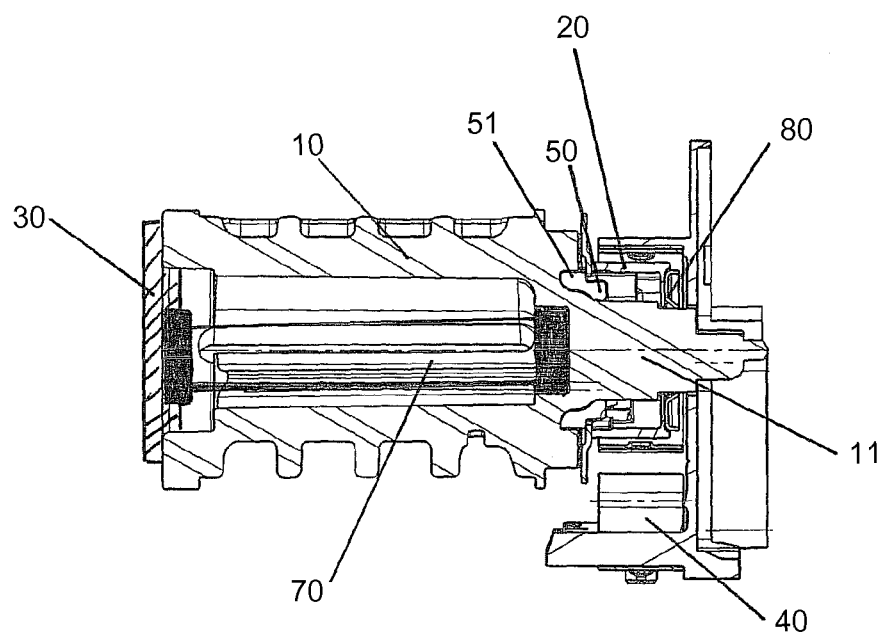
FIGS. 1a and 1b are cross-sectional views of a seat-belt pretensioner in accordance with this invention with a engagement wheel in both an engaged and unengaged position.
Figure 1B:
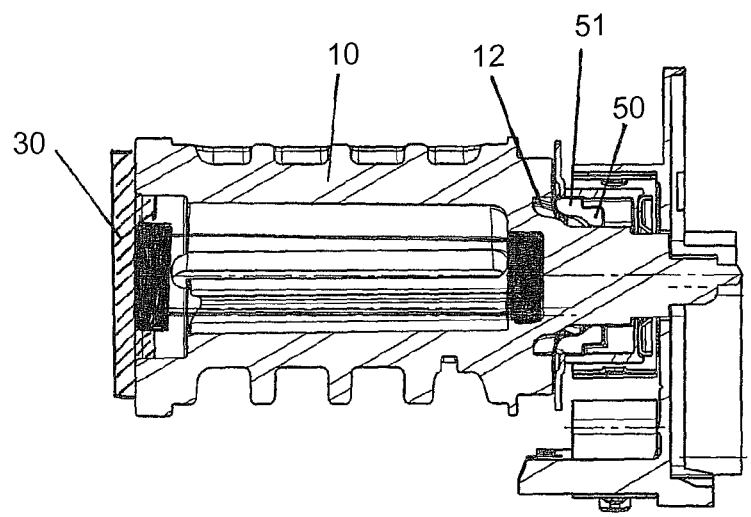

FIGS. 1a and 1b show the inventive seat-belt pretensioner with a seat-belt shaft 10, a lockable profile body 30 fixed to the vehicle opposite a housing, which is not shown, and a force limiting device 70 in the form of a torsion rod tightly tensioned on the seat-belt shaft 10 and on the profile body 30. Furthermore, a pretensioner drive 40 can be seen which, upon activation, drives the seat-belt shaft 10 in the winding direction for the pretensioning the seat-belt by means of a pretensioner drive wheel 20 and a engagement wheel 50. The pretensioner drive wheel 20 comprises a seat-belt shaft stud 11 and is secured to it with a lock ring 80. In FIG. 1a, the engagement wheel 50 is in a position in which it engages with its conical engagements 51, which will be described more precisely later, in corresponding recesses 12 on the seat-belt shaft 10 and thereby creates a positive connection between the pretensioner drive wheel 20 and the seat-belt shaft 10.

Figure 2:
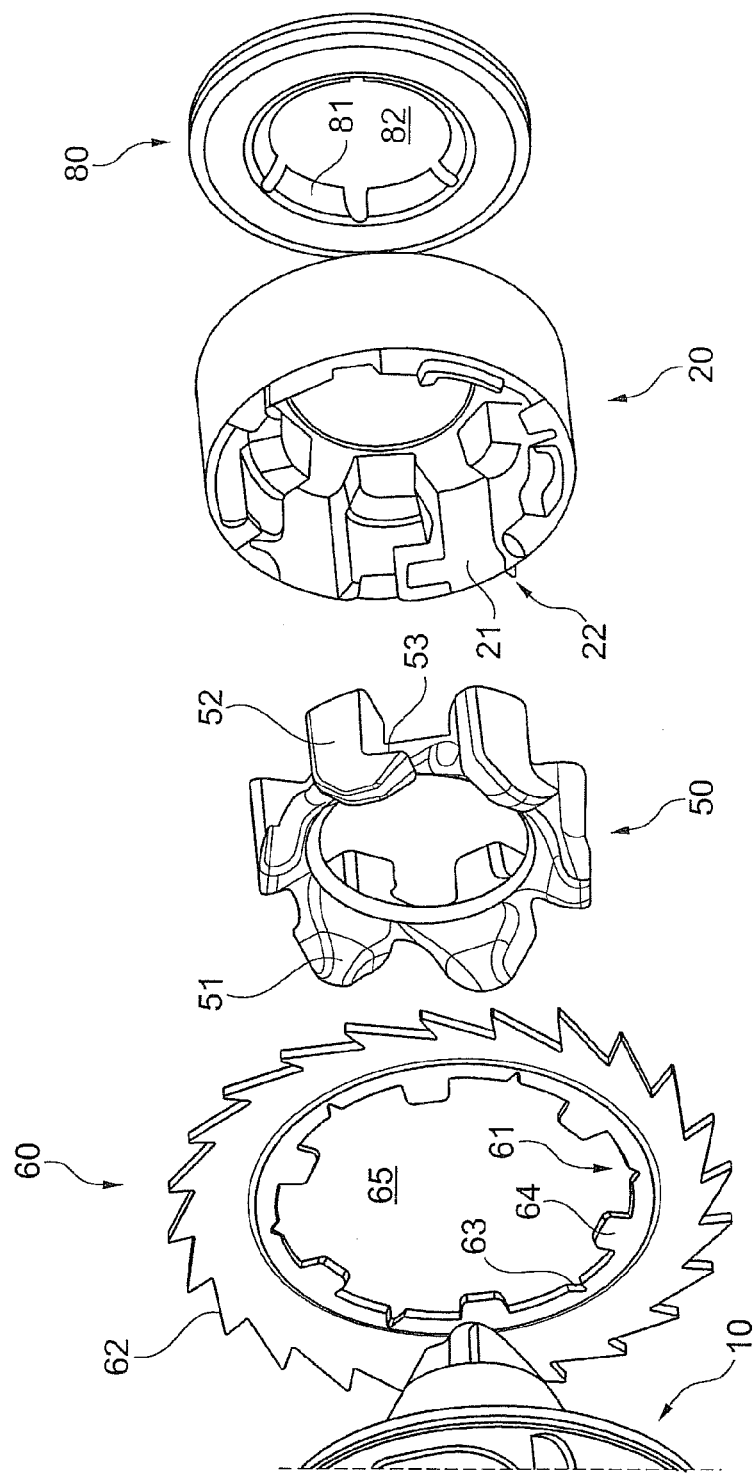
FIG. 2 is a exploded view of the seat belt shaft with a pretensioner drive wheel and a engagement wheel.

FIG. 2 shows an exploded view of the coupling mechanism to transmit the tensioning force exerted by the pretensioner drive 40 to the seat-belt shaft 10. The coupling mechanism comprises a pretensioner drive wheel 20, a engagement wheel 50, and a coupling element 60. In order to secure the coupling mechanism to the seat-belt shaft stud 11, a locking ring 80 with an opening 82 and elastic clamping tongues 81 protruding radially inward into the opening 82 is provided, whereby the locking ring 80 locks the coupling mechanism and in particular the pretensioner drive wheel 20 to the seat-belt shaft stud 11 in the extraction direction by wedging the clamping tongues 81. The pretensioner drive wheel 20 is provided on its radial interior side with a guiding structure 21 in the form of pockets and with a snap-off lug 22 protruding outward. The engagement wheel 50 has several axially aligned, conical engagement sections 51 with narrower fingers 52 connecting thereto, whereby a one-sided undercut 53 is provided at the transition from the engagement sections 51 to the fingers 52. The coupling element 60 is configured as a toothed coupling ring and has teeth 62 aligned radially outward and several protrusions 64 extending radially inward into the opening 65, between which corresponding free spaces 61 are formed. In each of the free spaces 61 a groove 63 is provided equidistant to the protrusions 64.

When assembling the coupling mechanism, the coupling element 60 is attached on the front side of the pretensioner drive wheel 20 aligned such that the snap-off lug 22 engages in one of the grooves 63 and the coupling element 60 is fixed in the circumferential direction. The engagement wheel 50 is subsequently inserted with the fingers 52 through the free spaces 61 between the protrusions 64 into the guiding structure 21 of the pretensioner drive wheel 20. The insertion movement of the engagement wheel 50 is thereby limited in that the engagement wheel 50 with the undercut 53 contacts the protrusions 64 of the coupling element 60. Since the coupling element 60 and the pretensioner drive wheel 20 are fixed onto each other in the circumferential direction by the snap-off lug 22, the engagement wheel 50 in this position is also fixed in the circumferential direction by the attachment of the fingers 52 to a side of the guiding structure 21 and the other side to the protrusions 64. Furthermore, the engagement wheel 50 is also secured in the axial direction by the protrusions 64 adjacent to the undercuts 53 so that the engagement wheel 50 is not unintentionally pressed into the pretensioner drive wheel 20 owing to higher forces. This combination of the pretensioner drive wheel 20, the engagement wheel 50, and the coupling element 60 is pushed onto the seat-belt shaft stud 11 and locked by the locking ring 80.

Figure 3A:
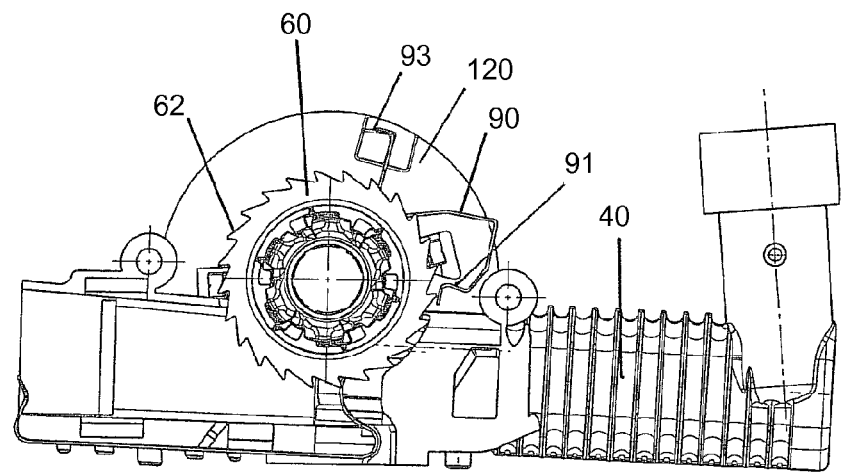
FIGS. 3a and 3c are side views of a seat-belt pretensioner with a blocking device in various positions.
Figure 3B:
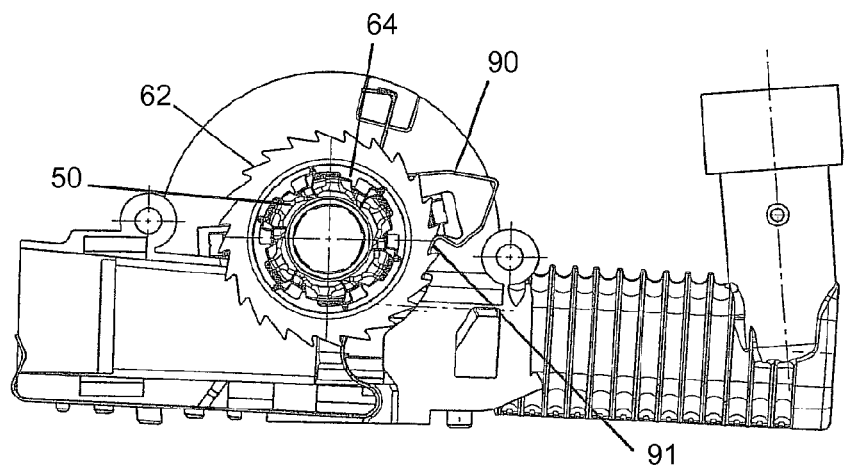
Figure 3C:
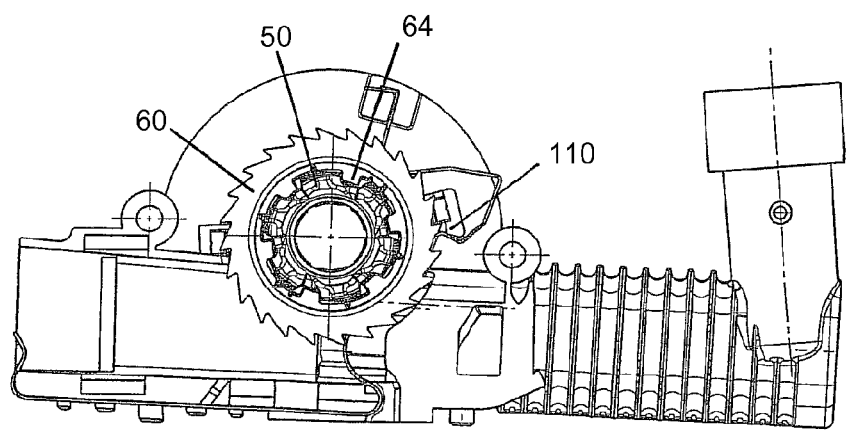

FIGS. 3a and 3c show the inventive seat-belt pretensioner in various positions before, during, and after the execution of the tensioning movement. Provided on the housing 120 of the seat-belt pretensioner is a blocking device 90 in the form of a bent spring which is shaped into a hook 93 on one end by means of which it is hung into a recess on the housing 120. The other free end of the spring is formed into a hook-shaped engagement section 91 and, contacts the exterior side of the teeth 62 of the coupling element 60 in the position prior to the activation of the seat-belt pretensioner, as shown in FIG. 3a.

In the position shown in FIG. 3b, the seat-belt pretensioner drives the seat-belt shaft 10 in the winding direction and the engagement section 91 is advanced to the teeth 62. While the seat-belt shaft 10 is actuated in the winding direction, the seat-belt pretensioner 20 rotates and thus also the coupling element 60 in the clockwise direction so that the engagement section 91 ratchets over the teeth 62 and does not prevent the clockwise rotating movement. After the tensioning movement has been completed, the seat-belt shaft 10 begins to rotate in the seat-belt extraction direction, that is, counter-clockwise in this Figure, when exceeding a force limiting level defined by the force limiting device 70. The rotation movement of the seat-belt shaft 10 is thereby transmitted via the conical engagement sections 51 of the engagement wheel 50 to the seat-belt drive wheel 20 and the coupling element 60, whereby the counterclockwise rotation movement of the coupling element 60 produced thereby is prevented by the engaging engagement sections 91 of the blocking device 90 so that the snap-off lug 22 on the seat-belt drive wheel 20 drops out, and the fixation of the coupling element 60 with respect to the seat-belt drive wheel 20 is stopped. A stop 110 is provided on the housing 120 of the seat-belt pretensioner at which the blocking device 90 contacts a section adjacent to the engagement section 91, so that any further counterclockwise rotation of the coupling element 60 is prevented in any case, and the connection between the coupling element 60 and the seat-belt drive wheel 20 is removed. In so far as the blocking device 90 and, in particular the engagement section 91, has an appropriate inherent stiffness, the stop 110, can, however, also be eliminated.

As can be seen in FIG. 3c, the coupling element 60 was twisted slightly in the circumferential direction with respect to the engagement wheel because of the blocking, so that the protrusions 64 are no longer located behind the undercuts 53 of the engagement wheel 50. Upon another rotation of the seat-belt shaft 10 in the seat-belt strap extraction direction the engagement wheel 50 is pushed out of the corresponding recesses 12 of the seat-belt shaft 10 to the position shown in FIG. 1b because of the conical shape of the engagement sections 51, so that the connection between the seat-belt shaft 10 and the seat-belt drive wheel 20 is removed. The connection between the seat-belt drive wheel 20 and the seat-belt shaft 10 is thereby immediately released by the force-limited seat-belt strap extraction movement, whereby only tangential forces act to release the coupling element 60. The conical shape of the engagement sections 91 thereby cause that an axial movement of the engagement wheel 50 is enforced by the rotation movement of the seat-belt shaft 10, by means of which the connection between the seat-belt drive wheel 20 and the seat-belt shaft 10 is removed.

Figure 4A:
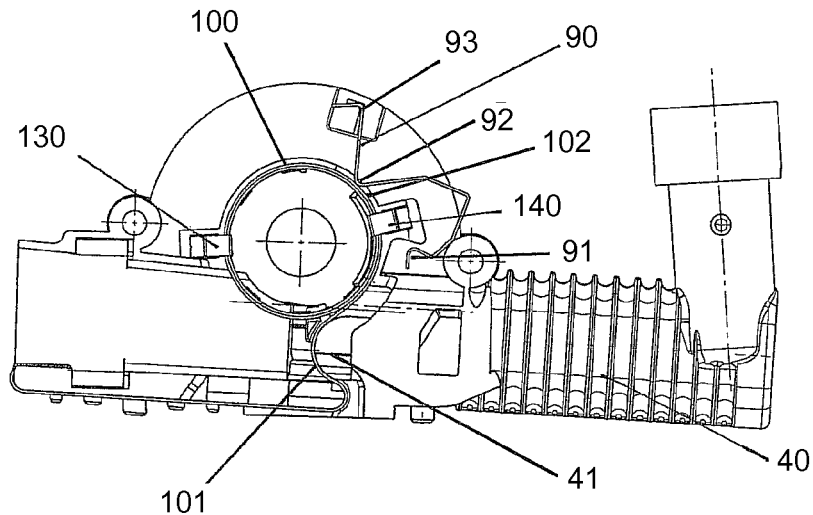
FIGS. 4a and 4b are side views of a seat-belt pretensioner in various positions with a strap and a spring resting thereon.
Figure 4B:
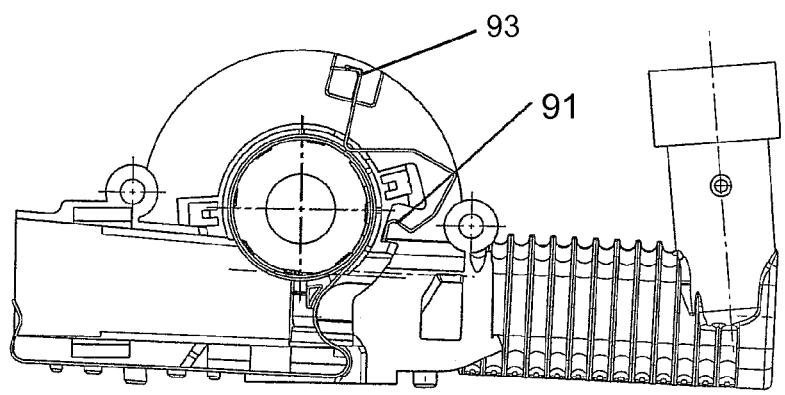

For a better understanding of the mode of operation of the blocking device 90 the seat-belt pretensioner is shown in FIGS. 4a and 4b without the seat-belt drive wheel 20, the coupling 60, and the engagement wheel 50. The seat-belt pretensioner comprises a seat-belt pretensioner drive 40 with a piston 41 which rests on a bearing section 101 of a strap 100. During the further course the strap 100 is wound into a wind-up section 102 of several windings which is fixed in position by fixing devices 130 and 140. The blocking device 90 rests on the outside of the wind-up section 102 with a support section 102 by actuating a spring tension.

In the position shown in FIG. 4a the seat-belt pretensioner has still not been activated so that the strap 100 is fixed on a larger diameter by the fixing devices 130 and 140 and the blocking device 90 does not engage in the teeth 62 because of the shape with the engagement section 91, as shown in FIG. 3a. By activating the seat-belt pretensioner, the piston 41 tensions the strap 100 across the bearing section 101 so that the wind-up section 102 is loosened from the fixing devices 130 and 140 and is pulled together to a smaller diameter. Because of the reduction of the wind-up section 102 the support section 92 of the blocking device 90 resting thereon likewise carries out a movement aimed radially outward by means of which the engagement section 91 engages in the teeth 62, as is also shown in FIG. 3b.

The advantage of the inventively designed blocking device 90 consists in that it is held in a mounted position shown in FIG. 4a and in that because of the shape and the contact with the wind-up section 102 it automatically swings into the blocking position upon activation of the seat-belt pretensioner, so that it is guaranteed in every case that the coupling element 60 is blocked at the start of the force-limited seat-belt strap extraction movement following the tensioning movement in the seat-belt extraction direction, and the connection between the seat-belt drive wheel 20 and the seat-belt shaft 10 is then automatically relieved by the rotation movement of the seat-belt shaft 10 in the seat-belt strap extraction direction.

While the above description constitutes the preferred embodiment of the present invention, it will be appreciated that the invention is susceptible to modification, variation and change without departing from the proper scope and fair meaning of the accompanying claims.

The invention claimed is:

1. A seat belt pretensioner comprising:
a housing, a belt shaft (10),
a load limiting device (70) connected with the belt shaft (10),
a pretensioner drive wheel (20) coupled to the belt shaft (10) in a rotationally fixed manner,
a coupling element (60) located on the pretensioner drive wheel (20), which is fixed in the circumferential direction via a detachable connection and can be locked in a housing-fixed manner in the belt webbing extraction direction by a blocking device (90), and
an engagement wheel (50) is provided for connecting the belt shaft (10) with the pretensioner drive wheel (20) having axially directed conical engagement portions (51) engages into corresponding recesses (12) on the belt shaft (10) or on the pretensioner drive wheel (20) and is fixed in the circumferential direction on the pretensioner drive wheel (20) by the coupling element (60), the detachable connection between the coupling element (60) and the pretensioner drive wheel (20) can be disconnected by the housing-fixed locking of the coupling element (60) and a rotation of the belt shaft (10) in the belt webbing extraction direction, and, thereby, the engagement wheel (50) is enabled to undergo a relative rotational movement in relation to the pretensioner drive wheel (20) or in relation to the belt shaft (10), which relative rotational movement is superimposed with an axial movement by the conical engagement portions (51), whereby the engagement portions (51) disengage from the recesses (12) and the form-closed connection between the pretensioner drive wheel (20) and the belt shaft (10) can be released,
wherein the coupling element (60) is connected with the pretensioner drive wheel (20) via a snap-off lug (22) which connects the coupling element from the pretensioner drive wheel.

2. The seat belt pretensioner according to claim 1, wherein in the pretensioner drive wheel (20) or in the belt shaft (10) a guide structure (21) is provided, in which the engagement wheel (50) is guided while undergoing the relative rotational movement.

3. The seat belt pretensioner according to claim 1, wherein the coupling element (60) in the position where it is fixed on the pretensioner drive wheel (20) secures the engagement wheel (50) against being displaced in the axial direction.

4. The seat belt pretensioner according to claim 1, wherein the coupling element (60) comprises teeth (62) which are directed in the belt webbing extraction direction, and that the blocking device (90) comprises an engagement section (91) which can be brought to engage into the teeth (62) by the activation of the seat belt pretensioner.

5. The seat belt pretensioner according to claim 4, wherein the blocking device (90) is formed by a spring, and that a stop (110) is provided on the seat belt pretensioner, which is allocated to the engagement section (91) and restricts the movement of the engagement section (91) in the belt webbing extraction direction.

6. A seat belt pretensioner comprising:
a housing, a belt shaft (10),
a load limiting device (70) connected with the belt shaft (10),
a pretensioner drive wheel (20) coupled to the belt shaft (10) in a rotationally fixed manner,
a coupling element (60) located on the pretensioner drive wheel (20), which is fixed in the circumferential direction via a detachable connection and can be locked in a housing-fixed manner in the belt webbing extraction direction by a blocking device (90), and
an engagement wheel (50) is provided for connecting the belt shaft (10) with the pretensioner drive wheel (20) having axially directed conical engagement portions (51) engages into corresponding recesses (12) on the belt shaft (10) or on the pretensioner drive wheel (20) and is fixed in the circumferential direction on the pretensioner drive wheel (20) by the coupling element (60), the detachable connection between the coupling element (60) and the pretensioner drive wheel (20) can be disconnected by the housing-fixed locking of the coupling element (60) and a rotation of the belt shaft (10) in the belt webbing extraction direction, and, thereby, the engagement wheel (50) is enabled to undergo a relative rotational movement in relation to the pretensioner drive wheel (20) or in relation to the belt shaft (10), which relative rotational movement is superimposed with an axial movement by the conical engagement portions (51), whereby the engagement portions (51) disengage from the recesses (12) and the form-closed connection between the pretensioner drive wheel (20) and the belt shaft (10) can be released,
wherein the seat belt pretensioner includes a strap (100) which wraps around the pretensioner drive wheel (20) and, upon activation of the seat belt pretensioner, rests against the pretensioner drive wheel (20) in a frictional manner at the same time diminishing the diameter, and wherein the blocking device (90) is formed by a spring which with a support portion (92) rests on the outer surface of the strap (100).

* * * * *